United States Patent [19]
Yamabuchi

[11] Patent Number: 5,898,482
[45] Date of Patent: Apr. 27, 1999

[54] OPTICAL RADAR APPARATUS

[75] Inventor: Hiroshi Yamabuchi, Tokyo, Japan

[73] Assignee: Mitsubishi Denki Kabushiki Kaisha, Tokyo, Japan

[21] Appl. No.: 08/797,945

[22] Filed: Feb. 12, 1997

[30] Foreign Application Priority Data

Aug. 21, 1996 [JP] Japan ..................................... 8-220229

[51] Int. Cl.⁶ ................................ G01C 3/08; B60T 7/16
[52] U.S. Cl. ........................ 356/4.01; 180/169; 356/5.01; 356/141.1
[58] Field of Search ............................... 356/5.01, 141.1; 180/169

[56] References Cited

U.S. PATENT DOCUMENTS

| | | |
|---|---|---|
| 3,551,050 | 12/1970 | Thorlin . |
| 3,698,812 | 10/1972 | Nelson . |
| 4,326,799 | 4/1982 | Keene et al. . |
| 4,477,184 | 10/1984 | Endo . |
| 5,510,889 | 4/1996 | Herr ......................................... 356/5.1 |
| 5,528,354 | 6/1996 | Uwira ...................................... 356/5.01 |
| 5,661,551 | 8/1997 | Yamabuchi . |
| 5,699,150 | 12/1997 | Katayama .............................. 356/4.01 |

FOREIGN PATENT DOCUMENTS 6-137867   5/1994   Japan .............................. G01C 3/06

*Primary Examiner*—Stephen C. Buczinski
*Attorney, Agent, or Firm*—Sughrue, Mion, Zinn, Macpeak & Seas, PLLC

[57] ABSTRACT

An optical radar apparatus, having a structure such that light generated by a laser generating means 1 is emitted to an object 100 while scanning the same, light reflected by the object 100 is reflected by a reflected-light reflecting means 10, and then a parabolic mirror or a concave mirror 19 receives reflected light above, is arranged to have a light receiving device 20 disposed at the position of the focal point of the parabolic mirror or the concave mirror 19 so as to obtain the distance to the object 100 and the direction of the same in accordance with propagation delay time taking from light emission by the light generating means 1 to receipt of reflected light by the light receiving device 20.

8 Claims, 2 Drawing Sheets

OPTICAL RADAR APPARATUS

BACKGROUND OF THE INVENTION

The present invention relates to an optical radar apparatus arranged to scan light in a horizontal direction to receive light reflected by an object and returned to the optical radar apparatus so as to detect the distance from the light source to the object and the direction of the object.

Conventionally, an optical radar apparatus of the foregoing type has been proposed to be mounted on a vehicle so as to be used widely as an apparatus for monitoring around the vehicle or an apparatus for controlling the distance from a vehicle ahead. A multiplicity of optical radar apparatuses, each of which is mounted on a vehicle, have been attempted, as disclosed in Japanese Patent Publication 6-137867 to decrease the dead angle by scanning light in the horizontal direction so as to widely detect objects. In general, the optical system for receiving reflected light comprises a lens.

Apparatuses of the above-mentioned type is required to have a small size so as to be disposed in a limited space.

Since a large light receiving aperture is required to maintain the performance of the radar, a limit contradicting the above-mentioned requirement arises.

SUMMARY OF THE INVENTION

A optical radar apparatus according to the present invention comprises: light emitting means for emitting light from light generating means to an object while scanning the object with light; reflected-light reflecting means for reflecting light reflected by the object; a parabolic mirror or a concave mirror for reflecting light reflected by the reflected-light reflecting means; a light receiving element disposed at the position of the focal point of the parabolic mirror or the concave mirror; distance calculating means for calculating the distance to the object in accordance with a propagation delay time taking from light emission by the light generating means to receipt of reflected light by the light receiving device; and direction detection means for detecting the direction of the object in accordance with the scanning angle of scanning light emitted from the light emitting means.

The above-mentioned structure is arranged such that the light emitting means includes emitted-light reflecting means for reflecting light generated by the light generating means, and the emitted-light reflecting means and the reflected-light reflecting means are swung in a state where they are held at predetermined relative positions so that emitted light is used to scan a predetermined direction.

The parabolic mirror or the concave mirror has a curved surface so that the coordinates of the outer periphery thereof in the direction of the optical axis is substantially the same as the value of the focal point.

The optical radar apparatus according to the present invention is theoretically free from generation of aberration at the focal point because of the synergistic effect of using the parabolic mirror or the concave mirror and the rotative reflected-light reflecting means. The foregoing effect realizes an advantage to be obtained in that the performance of the radar can uniformly be obtained over the scanning range in the horizontal direction.

Moreover, the optical radar apparatus according to the present invention is able to reduce the size thereof because the parabolic mirror or the concave mirror is employed.

Moreover, the optical radar apparatus according to the present invention is able to improve the light converging efficiency by 20% or more because the parabolic mirror or the concave mirror is used. Therefore, if the same area of the aperture is provided, the S/N ratio of the light receipt signal can be improved by 20%. As an alternative to this, the area of the aperture can be reduced by 20% if the same performance of the radar is obtained. Consequently, the size of the apparatus can be reduced.

DETAILED DESCRIPTION OF PREFERRED EMBODIMENTS

Figure 1:
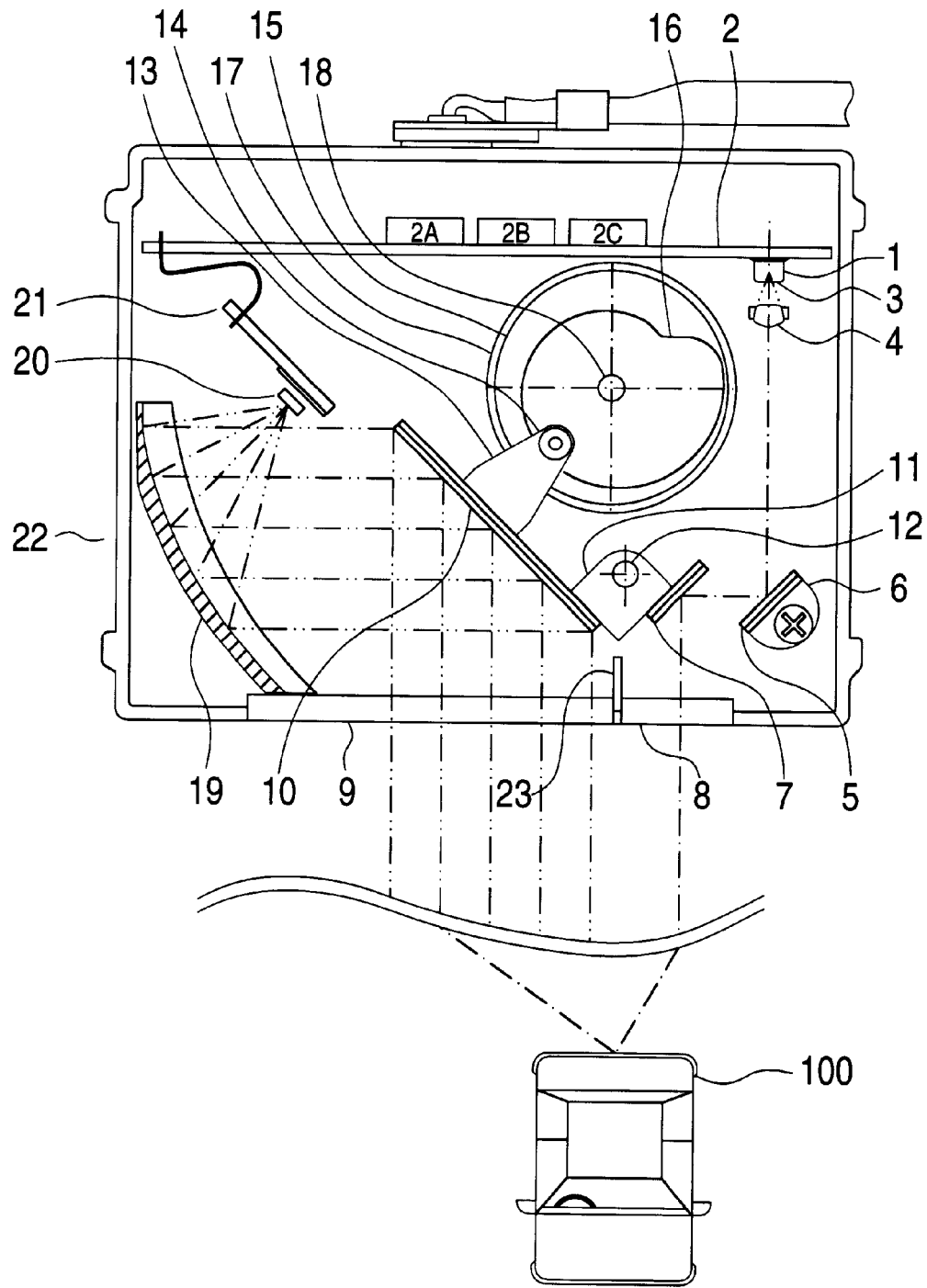
FIG. 1 is a plan cross sectional view showing the structure of the optical radar apparatus according to a first embodiment of the present invention.

FIG. 1 is a plan cross sectional view showing the internal structure of an optical radar apparatus according to the present invention. An optical radar apparatus is mounted on, for example, a vehicle so as to detect an object in front of the vehicle. Referring to FIG. 1, reference numeral 1 represents a laser diode serving as a light generating means for generating a laser beam, 2 represents a main board having a light generating circuit for operating the laser diode 1 and other electronic circuits, for example, a distance calculating means 2A, a direction detection means 2B, a step motor driving means 2C and the like, mounted thereon, and 3 represents a light generating source accommodated in the laser diode 1. Reference numeral 4 represents a convex lens for adjusting the diffusion angle of the generated laser beam, 5 represents a mirror serving as a reflecting member for reflecting the laser beam from the convex lens 4 at a predetermined angle, and 6 represents a support member for supporting the mirror 5. The mirror 5 and the support member 6 form a light emitting direction adjustment means for adjusting the direction of light emitted from the optical radar apparatus. The light emitting direction adjustment means displaces the orientation of the mirror 5 so as to adjust the laser beam emitted from the optical radar apparatus and light reflected by the subject object and returned from the same to be formed into parallel beams.

Reference numeral 7 represents mirror serving as an emitted-light reflecting means for receiving the laser beam reflected by the mirror 5 and for reflecting the same. The laser beam penetrates a glass plate 8, and then transmitted to the outside of the optical radar apparatus. The emitted laser beam is reflected by a front vehicle 100, which is the object, reflected light being allowed to penetrate a glass plate 9, and then received and reflected by a mirror 10 which is a reflected-light reflecting means having an area larger than that of the mirror 7. Referring to FIG. 1, wavy lines formed by continuous lines drawn between the optical radar apparatus and the front vehicle 100 indicate a fact that the distance between the optical radar apparatus and the front vehicle 100, which are actually positioned apart from each other for a long distance, is shortened in FIG. 1.

Reference numeral 11 represents an L-shape rigid member serving as a holding means for holding the mirror 7 and the mirror 10 at predetermined relative positions, that is, for causing the two members apart from each other by about 90° in the horizontal direction, the rigid member 11 being formed into a shape formed by bending a plate-like member by 90°. One of the two surfaces of the L-shape structure is longer than the other surface. The mirror 7 is secured to the shorter surface (small area) of the surfaces of the L-shape structure. The mirror 7, mirror 10 and the rigid member 11 are integrated to form one rigid member. Reference numeral 12 represents a rotational shaft of the rigid member 11. The rigid member 11 is rotatively supported around the rotational shaft 12 which is the center of rotation. A tongue-shape projection 13 is formed on the longer surface of the rigid member 11 and having a roller-type follower 14 at the leading end thereof. The follower 14 is pressed against the surface of a cam groove 16 formed in a cam 15 by a pressing means (not shown) comprising, for example, a spring. Reference numeral 17 represents a step motor for rotating the cam 15. Reference numeral 18 represents a drive shaft of the step motor 17, the drive shaft 18 having the cam 15 secured thereto.

Reference numeral 19 represents a parabolic mirror for converging light reflected by the mirror 10. Reference numeral 20 represents a light receiving element serving as a light receiving means disposed adjacent to the focal point of the parabolic mirror 19 and arranged to receive reflected light converged by the parabolic mirror 19 so as to generate an electric signal corresponding to the intensity of received light. Reference numeral 21 represents a sub-board having the light receiving device 20 mounted thereon, the sub-board 21 having a received-signal amplifying circuit for amplifying the electric signal which has been photoelectrically converted. Note that the light receiving device 20 is disposed apart from the foregoing laser diode 1 in the horizontal direction. The light receiving device 20 is disposed on a light reflection passage to receive reflected light returned from the right in front of the optical radar apparatus, made incident upon the mirror 10 and reflected to the left when viewed in the drawing by about 90°. Reference numeral 22 represents a shell serving as a case to form the outer wall of the optical radar apparatus in cooperation with the glass plates 8 and 9. Reference numeral 23 represents a shielding member serving as a shielding means for shielding the mirror 7 and mirror 10 from each other in order to prevent interference of the emitted laser beam and light reflected from the object so that emitted light is not leaked to the portion including the light receiving device.

Figure 2:
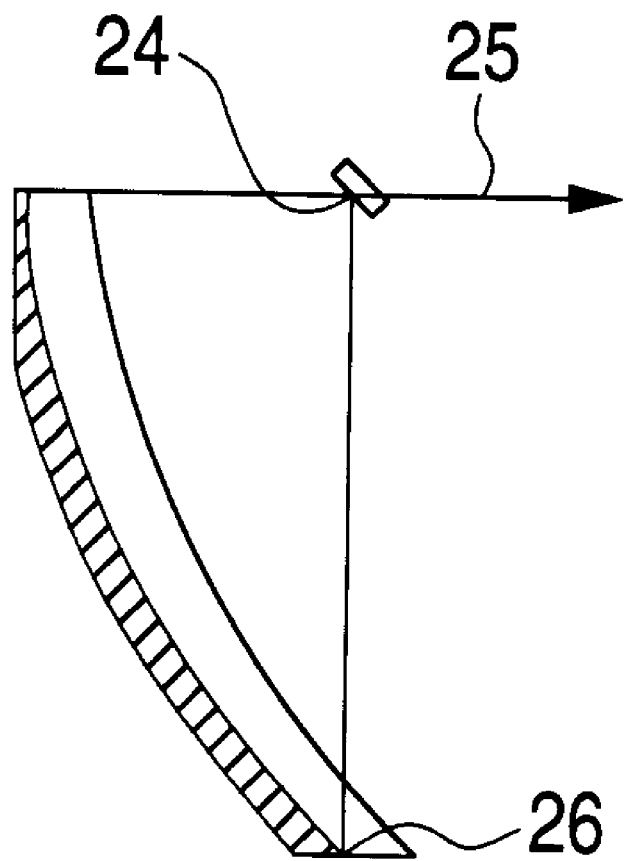
FIG. 2 is a cross sectional view showing the detailed structure of the parabolic mirror according to the present invention.

FIG. 2 is a detailed view of the parabolic mirror 19. Light reflected by the reflected-light reflecting means 10 is reflected by the parabolic surface to focus on the surface of the light receiving device 20. Reference numeral 24 represents a focal point, 25 represents an optical axis and 26 represents an outer periphery of the parabolic mirror.

The operation will now be described. The laser diode 1 is operated by the light generating circuit mounted on the main board 2 so that a laser beam is generated from the light generating source 3. The optical beam of the generated laser is formed to have a predetermined divergent angle by the convex lens 4, and projected. The convex lens 4 forms the laser beams to have a divergent angle of about 0.1° in the horizontal direction and about 4° in the vertical direction. The formed laser beams are, by the mirror 5, reflected into the left-hand direction when viewed in the drawing to make an angle of about 90°, and then made incident upon the mirror 7 and reflected by the same. The laser beams reflected by the mirror 7 are allowed to pass through the glass plate 8, and then transmitted to the front portion of the optical radar apparatus. At this time, the insulating member 23 interrupts the laser beams leaked toward the light receiving device 20 attributable to the internal reflection of the optical radar apparatus so that the light receiving device 20 does not erroneously detect the laser beam. The thus-transmitted laser beam is used to irradiate the vehicle 100, which is the object positioned in front of the optical radar apparatus, and reflected by the same. Note that the passage, through which the laser beam generated by the light generating source 3 passes, and in which the convex lens 4, mirror 5, mirror 7, glass plate 8 and the front vehicle 100 are disposed, form a laser-beam transmission passage.

The laser beam reflected by the front vehicle 100 is reflected into various directions and a portion of the same is returned to the optical radar apparatus. Reflected light returned to the optical radar apparatus is allowed to pass through the glass plate 9, made incident upon the mirror 10 and reflected by the same. Reflected light above is made incident upon the parabolic mirror 19 so that incident light above is converged by the parabolic mirror 19 and focused on the light receiving surface of the light receiving device 20 disposed adjacent to the position of the focal distance of the parabolic mirror 19. The light receiving device 20 performs photoelectrical conversion so that an electric signal corresponding to the intensity of light above is transmitted. The received-signal amplifying circuit mounted on the sub-substrate 21 amplifies the electric signal, which has been photoelectrically converted, and transmits the received signal to the main substrate 2. Note that the passage, through which light reflected by the front vehicle 100 passes and on which the glass plate 9, mirror 10, parabolic mirror 19 and the light receiving device 20 are disposed, forms a light receiving passage.

The distance calculating means 2A mounted on the main board 2 measures time taken from the moment at which the light generating circuit has operated the laser diode 1 to the moment at which the light receiving device 20 generates the signal and considers the measured time to be time taken for the laser beam to go and return to and from the front vehicle 100, that is, the propagation delay time to calculate the distance to the vehicle 100 in accordance with the propagation delay time. The direction detection means 2B mounted on the main board 2 detects the direction of transmission of the laser beam in accordance with the angular position of the rotated step motor 17 and the profile (the shape) of the cam groove 16.

The operation for scanning with the laser beam in the horizontal direction will now be described. The step motor rotating means 2C mounted on the main board 2 supplies an operation signal to the step motor 17 whenever the foregoing object detection process is completed or at every predetermined time. The accumulating totals of supply of the operation signals are counted by a counter which is a counting means (not shown). The result of counting is communicated to the direction detection means 2B. The direction detection means 2B calculates the angular position of the rotated step motor 17. The step motor 17 rotates the drive shaft 18 by a predetermined angle whenever the operation signal is supplied. In synchronization with this, also the cam 15 rotates by a predetermined angle. The rotation of the cam 15 causes also the cam groove 16 to be rotated. Since the follower 14 is in slidably contact with the cam groove 16, the rotation of the cam groove 16 causes the distance from the follower 14 to the drive shaft 18 to be displaced. The above-mentioned displacement is, through the projection 13, transmitted to the rigid member composed of the mirror 7, mirror 10 and the rigid member 11. The rigid member composed of the three members is integrally rotated around the rotational shaft 12. The step motor rotating means 2C, step motor 17, cam 15, cam groove 16, follower 14 and the projection 13, in cooperation with one another, form a scanning means.

In the above optical radar apparatus, the laser beam emitted from the optical radar apparatus and light reflected from the object are adjusted to be parallel beams by the mirror 5. Moreover, since the mirrors 7 and 10 are integrally rotated in a state where they are apart from each other by about 90° in the horizontal direction, light reflected from object can reliably be made incident upon the light receiving element 20 regardless of the direction of the rotation of the rigid member 11 for emitting the laser beam. Theoretically, if the incidental angle of light which is made incident upon the mirror 7 is larger than 0° and smaller than 90°, an object can be detected. Therefore, a considerably wide scanning range can be realized.

The parabolic mirror 19 of the light receiving means of the optical radar apparatus will now be described with reference to FIG. 2. For example, the parabolic mirror is designed in accordance with data such that the focal distance is 20 mm, the size of the aperture is 40×40 mm$^2$, the equivalent diameter of the aperture is 45 mm, the equivalent F-number is 0.44, the parabolic constant is 1/80, the reflecting surface is formed by vacuum-evaporating aluminum and has an oxidation preventive film made of magnesium oxide. The reflection factor is 90% on average (the number of samples is six). The confirmed durability of the film is such that the film is free from change in the reflection factor and separation after the sample of the film has been subjected to a temperature cycle test in which 200 cycles from −40° C. to 125° C. are performed such that each cycle is performed for 2 hours.

The parabolic mirror 19 focuses reflected light, which is always made incident as parallel beams with respect to the optical axis 25, onto the surface of the light receiving device 20 disposed adjacent to the focal point 24.

Therefore, the optical radar apparatus according to the present invention has the light receiving structure the size of which in the optical direction was halved as compared with the conventional structure (the parabolic mirror has the size of 20 mm, while the fresnel lens has the size of 40 mm). As described above, the size of the apparatus can be reduced. Specific data is as follows: the focal distance is 20 mm, the area of the aperture is 1600 mm$^2$, the equivalent aperture diameter is 45 mm and the F-number is 0.44. That is, a portion, in which a plane perpendicular to the optical axis 25 at the focal point 24 and the curved surface of the parabolic mirror 19 intersect, is made to be the outer periphery 26 of the parabolic mirror 19. The foregoing structure enables the ratio of the volume of the optical system with respect to the amount of light received by the optical system to be minimized. As a result, an optimum design for size reduction can be performed as described above.

Since the optical radar apparatus employs the parabolic mirror or the concave mirror to serve as the light receiving means, size reduction of the apparatus can be realized while maintaining the performance as the radar. That is, a light converging optical system realized by a lens involves the size in the direction of the optical axis being enlarged (that is, the lens is thickened) and therefore disadvantageous in reducing the size of the apparatus. Since the fresnel lens has a poor light converging efficiency of about 70% in terms of the F-number (the light converging efficiency deteriorates toward the outer periphery of the lens), any contrivance of enlarging the area of the aperture or elongating the focal distance is required to obtain a required quantity of light. Thus, each method is disadvantageous in reducing the size of the apparatus. On the other hand, the optical radar apparatus according to the present invention having the parabolic mirror or the concave mirror as the light receiving means is able to have the light converging efficiency of about 90%. Therefore, the area of the aperture can be reduced to 77% and the size in the optical axis (the focal distance) can be reduced to 66% (a comparison of the F-number resulted in the lens having 0.67 and the concave mirror trial-manufactured having 0.44) if the same quantity of received light is obtained.

As a result of the synergistic effect of the characteristic that aberration is not generated at the focal point because the parabolic mirror is employed and the rotative reflected-light reflecting means, an effect can be obtained in that the performance of the radar can uniformly be obtained over the scanning range in the horizontal direction.

What is claimed is:

1. An optical radar apparatus, comprising:

a housing having a first transparent surface and a second transparent surface optically isolated from the first transparent surface by an optical shielding member;

a light source for emitting a light beam;

a first reflector adapted to reflect the light beam through the first transparent surface toward an object external to said housing;

a second reflector adapted to reflect light reflected by the object and entering said housing through the second transparent surface;

one of a parabolic mirror and a concave mirror, for converging the light reflected by said second reflector, such that the reflected light converges at a focal point of said parabolic mirror or said concave mirror; and a light receiving element disposed at the focal point, said light receiving element detecting the reflected light converged at the focal point and generating an electric signal corresponding to an intensity of the reflected light.

2. The optical radar system according to claim 1, wherein an outer periphery of said parabolic mirror or said concave mirror lies in a plane which passes through the focal point and which is perpendicular to the optical axis of said parabolic mirror or said concave mirror.

3. The optical radar apparatus according to claim 1, further comprising:

a distance calculator for calculating a distance to the object in accordance with a propagation delay time between emission of the light beam by said light source and reception of the reflected light by said light receiving element; and a direction detector for detecting a direction of the object in accordance with a scanning angle of the light beam reflected by said first reflector.

4. The optical radar system according to claim 3, wherein an outer periphery of said parabolic mirror or said concave mirror lies in a plane which passes through the focal point and which is perpendicular to the optical axis of said parabolic mirror or said concave mirror.

5. The optical radar apparatus according to claim 1, wherein said first and second reflectors are disposed relative to each other at a fixed angle in the horizontal direction.

6. The optical radar apparatus according to claim 5, wherein the fixed angle is about 90° in the horizontal direction.

7. The optical radar apparatus according to claim 5, further comprising:

a vertically extending shaft coupled to said first and second reflectors; and a rotatable cam having an eccentric cam groove, wherein said second reflector is slidably coupled to the eccentric cam groove, such that rotation of said cam causes said first and second reflectors to pivot about said shaft, thereby causing the light beam to scan horizontally.

8. The optical radar apparatus according to claim 7, wherein said second reflector is larger than said first reflector.

* * * * *